United States Patent
Meisiek et al.

(10) Patent No.: US 8,712,227 B2
(45) Date of Patent: Apr. 29, 2014

(54) FLUID CONDUIT WITH PTC FABRIC HEATING

(75) Inventors: Juergen Meisiek, Muensterdorf (DE); Torsten Maulitz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 284 days.

(21) Appl. No.: 13/101,949

(22) Filed: May 5, 2011

(65) Prior Publication Data

US 2011/0274418 A1  Nov. 10, 2011

Related U.S. Application Data

(60) Provisional application No. 61/332,313, filed on May 7, 2010.

(30) Foreign Application Priority Data

May 7, 2010 (DE) .......... 10 2010 019 777

(51) Int. Cl.
| H05B 3/06 | (2006.01) |
|---|---|
| H05B 3/58 | (2006.01) |
| F24H 1/14 | (2006.01) |
| E03B 7/12 | (2006.01) |

(52) U.S. Cl.
USPC .......... 392/479; 392/472; 392/480; 392/482; 219/504; 219/529; 219/535; 219/536; 219/541; 219/544; 219/549

(58) Field of Classification Search
None
See application file for complete search history.

(56) References Cited

U.S. PATENT DOCUMENTS

| 2,274,839 | A | | 3/1942 | L. Marick | |
|---|---|---|---|---|---|
| 4,045,949 | A | | 9/1977 | Paton et al. | |
| 4,348,584 | A | * | 9/1982 | Gale et al. | 219/549 |
| 4,455,474 | A | * | 6/1984 | Jameson et al. | 392/472 |
| 4,553,023 | A | * | 11/1985 | Jameson et al. | 392/472 |
| 4,874,925 | A | * | 10/1989 | Dickenson | 392/472 |
| 6,054,690 | A | * | 4/2000 | Petit et al. | 219/528 |
| 6,126,483 | A | | 10/2000 | Kirma et al. | |
| 6,713,733 | B2 | * | 3/2004 | Kochman et al. | 219/549 |

(Continued)

FOREIGN PATENT DOCUMENTS

| CA | 2457912 A1 | 3/2003 |
|---|---|---|
| CN | 1529534 A | 9/2004 |

(Continued)

OTHER PUBLICATIONS

German Office Action for German Patent Application 102010019777.7 mailed on Apr. 12, 2011.

(Continued)

Primary Examiner — Joseph M Pelham
(74) Attorney, Agent, or Firm — Ingrassia Fisher & Lorenz P.C.

(57) ABSTRACT

Fluid conduit segments are provided that include, but are not limited to integrated heating systems for protection against freezing. To this effect PTC-fabric heating elements are provided that are integrated in the fluid conduit segments and that in the negative temperature range include, but are not limited to a PTC-temperature-dependent resistance. The heating system thus provides a higher output in the negative temperature range and a lower output in the positive temperature range, i.e., the heating limits itself until temperature equalization has been reached.

17 Claims, 6 Drawing Sheets

(56) References Cited

U.S. PATENT DOCUMENTS

| | | | |
|---|---|---|---|
| 7,053,344 B1* | 5/2006 | Surjan et al. | 219/549 |
| 7,202,445 B2 | 4/2007 | Yamada | |
| 7,937,789 B2 | 5/2011 | Feher | |
| 2002/0040900 A1* | 4/2002 | Arx et al. | 219/544 |
| 2002/0168184 A1* | 11/2002 | Meisiek | 392/435 |
| 2003/0189037 A1* | 10/2003 | Kochman et al. | 219/549 |
| 2004/0217106 A1* | 11/2004 | Giterman | 219/486 |
| 2006/0137099 A1 | 6/2006 | Feher | |
| 2007/0086757 A1 | 4/2007 | Feher | |
| 2010/0126986 A1 | 5/2010 | Guenzing et al. | |
| 2011/0259872 A1* | 10/2011 | Wang et al. | 219/492 |

FOREIGN PATENT DOCUMENTS

| | | |
|---|---|---|
| DE | 19726419 A1 | 1/1999 |
| DE | 29923550 U1 | 2/2001 |
| DE | 202005004602 U1 | 7/2005 |
| DE | 212004000036 U1 | 10/2006 |
| DE | 102008055891 A1 | 5/2010 |
| EP | 0312204 A2 | 4/1989 |
| EP | 0991300 A2 | 4/2000 |
| EP | 1566318 A1 | 8/2005 |
| EP | 1710484 A1 | 10/2006 |
| GB | 2324585 A | 10/1998 |
| WO | 2004048165 A1 | 6/2004 |
| WO | 2006004282 A1 | 1/2006 |
| WO | 2006010436 A1 | 2/2006 |
| WO | 2007032970 A2 | 3/2007 |

OTHER PUBLICATIONS

Park, Sangu, Conductive Composition for Producing Carbon Flexible Heating Structure, Carbon Flexible Heating Structure Using the Same, and Manufacturing Method Thereof, Patentdocs [retrieved on Nov. 25, 2009], Retrieved from Internet <URL:http.//www.faqs.ort/patents/app/20080251510>.

* cited by examiner

FLUID CONDUIT WITH PTC FABRIC HEATING

CROSS-REFERENCE TO RELATED APPLICATIONS

This application claims the priority benefit of the filing date of German Patent Application No. 102010019777.7 filed May 7, 2010 and the priority benefit of the filing date of U.S. Provisional Patent Application No. 61/332,313 filed May 7, 2010, the disclosures of which from both applications is hereby incorporated herein by reference.

TECHNICAL FIELD

The technical field relates to frost protection of fluid conduits. In particular, the technical field relates to a self-heating fluid conduit segment for an aircraft to protect against icing of the fluid conduit segment, to a self-heating fluid conduit system for an aircraft and to an aircraft with a multitude of fluid conduit segments.

BACKGROUND

Unless countermeasures are taken, in a cold climate, water conduits, especially in commercial aircraft, can freeze at high altitudes or when the aircraft is parked. For this reason it is necessary to heat or to drain these water conduits. For heating, as a rule, heating strips may be used which can, for example, comprise two electrical conductors, a semiconductor situated in between, and an insulation layer, which heating strips in several sections are installed parallel to the conduits. Materials used include, for example, cellulose with PVC coatings. At least some of these materials may not be self-extinguishing or they may be toxic and smoke-emitting. Furthermore, the cellulose materials may be hygroscopic.

Due to their limited bending radius, the relatively high temperature on the narrow surface (approximately 1 cm width), their movement limits in the three spatial directions, their relatively substantial thickness, their relatively heavy weight, the type of attachment and connection, FEP heating strips may be associated with certain disadvantages when compared to flexible heating elements. Resistance heaters may comprise wires or foils and which in the positive and in the negative temperature ranges have identical rated outputs, in other words constant resistance, and therefore because of the different local temperature profile may require individual control circuits in the aircraft. DE 197 26 419 A1 and U.S. Pat. No. 6,126,483 describe heat-conductor connection systems in an aircraft, which is hereby incorporated in its entirety by reference.

SUMMARY

The exemplary embodiments described below relate equally to the self-heating fluid-conduit segment, the self-heating fluid conduit system and the aircraft. In other words the characteristics described below, for example in relation to the fluid conduit segment, may also be implemented in the fluid conduit system and in the aircraft and vice versa.

According to an embodiment, a self-heating fluid conduit segment for an aircraft to protect against icing of the fluid conduit segment is stated. The self-heating fluid conduit segment comprises an inner hose for conducting fluid, and a heating device. The heating device comprises a positive temperature coefficient (PTC)-fabric heating element that is integrated in the fluid conduit segment, and in the negative temperature range, the temperature measured in degrees centigrade, comprises a lower PTC-temperature-dependent resistance than it does in the positive temperature range. This may provide for an improved frost protection of water conduits in aircraft.

For example, the PTC-fabric heating element is designed in such a manner that it comprises a resistance which changes in the temperature range from minus approximately 63 degrees Celsius to approximately plus 85 degrees Celsius, with such change being, for example, essentially linear. In other words, the resistance increases with increasing temperature, starting at a temperature of approximately −63° or approximately −70° C. until a temperature of approximately +80° or approximately +85° C. is reached.

This is, among other things, achieved in that a thread is made to contain soot particles. For example, the soot particles can be dissolved in a fluid, with the thread being impregnated with this fluid. Furthermore, the soot can be applied in a dry form. Moreover, polymer threads can be used. The soot comprises, for example, primary particles of a size between two and four nanometers.

Due to the monotonic temperature characteristic of the resistance in the negative and in the positive temperature range, and in particular due to the PTC-characteristics in this temperature range, no inverting electronics may used for heating. Furthermore, power savings in the higher temperature range result. The fabric heating element can be designed in such a manner that it encases the entire inner hose. In this manner homogeneous heating of the inner hose is possible.

The PTC-behavior can be related to the thermal expansion, or contraction, of the fabric heating device during an increase in the temperature, or decrease in the temperature, and the associated increase, or decrease, of the space between individual molecules that are responsible for the conductivity.

According to a further embodiment, a self-heating fluid conduit system for an aircraft is stated, which fluid conduit system comprises a multitude of self-heating fluid conduit segments, as described above and below. Furthermore, the system comprises a multitude of corresponding connecting elements, In each case one of the connecting elements in each case interconnects at least two fluid conduit segments mechanically and/or, if applicable, electrically.

According to a further embodiment, an aircraft comprising a multitude of fluid conduit segments described above and below or comprising a self-heating fluid conduit system described above and below is stated.

According to an embodiment, the PTC-fabric heating element comprises glass filament, polymer and/or polyimide. According to a further embodiment of the invention, the PTC-fabric heating element comprises a glass filament thread, a polymer thread, soot particles and a polyimide coating. According to a further embodiment of the invention, the PTC-fabric heating element comprises a cellulose thread that is impregnated against flammability and humidity, as well as soot particles, glass filament and a polyimide coating.

According to a further embodiment, the fluid conduit segment is designed so as to be flexible at least for installation. In particular, the PTC-fabric heating element is flexible, for example even elastic. In this manner, instances of deformation of the aircraft, which deformation can occur as a result of substantial temperature differentials and pressure differentials and as a result of wind gusts, can be absorbed and equalized by the fluid conduit segment or the entire conduit system. This does not require any flexible bearing arrangements or joints of the pipe segments. In contrast to an interface comprising two rigid conduits, in a hose-to-pipe connection the installation tolerances do not pose a problem.

Consequently, in this manner pipe installation problems in an aircraft can be solved much more flexibly.

According to a further embodiment, the fluid conduit segment further comprises an outer insulation sheath comprising plastic foam, which insulation sheath is applied after installation of the fluid conduit segment in the aircraft. Furthermore, the fluid conduit segment with the outer insulation sheath can still be adequately flexible, for example sufficiently flexible to overcome, without any damage, torsion that acts on the aircraft during flight.

According to a further embodiment, the fluid conduit segment comprises a multilayer design. The PTC-fabric heating element is embedded in a silicon-aramid compound or a Kevlar compound or a Nomex compound. According to a further embodiment, the PTC-fabric heating element is covered by a metallic shielding braid.

According to a further embodiment, the fluid conduit segment comprises a sheath layer for mechanically protecting the PTC-fabric heating element. According to a further embodiment, this sheath layer is designed as a fabric layer comprising an aramid or Kevlar or Nomex sheath.

According to a further embodiment, the PTC-fabric heating element is designed in a hose-like manner or is helically wound onto the inner hose, is folded around the hose so as to abut, or is designed so as to be strip-shaped, wherein in this case it is bonded to the inner hose so as to be parallel to said inner hose.

According to a further embodiment, the fluid conduit segment further comprises an electrical connection for connecting the PTC-fabric heating element to an external energy supply. The electrical connection is designed so as to be waterproof.

According to a further exemplary embodiment, the fluid is a fuel for a drive of the aircraft, or is water, air or hydraulic fluid.

The fluid-conducting conduits are preferably to be heated directly, because the heating device is integrated in the conduit segments. The heating device comprises a PTC-fabric heating device that comprises a temperature-dependent resistance ranging from minus approximately 63 degrees Celsius to plus approximately 85 degrees Celsius. Furthermore, the conduit segments are mechanically flexible (pliable). As a result of the integration of the fabric heating device in the conduit segments, the heat output can continuously be provided to the entire conduit system. Because of the PTC-behavior, no control electronics are required, in contrast to the use of an NTC-heating fabric, for inverting control, because the heat output is automatically set according to the temperature of the PTC-fabric heating device. In this manner it may be possible to avoid a situation in which the heat output provided is greater than necessary, and consequently the energy consumption and thus the fuel consumption of the aircraft may be reduced.

Since the fluid-conducting conduit segments are heated directly, installation can be simplified. This may result in improved thermal transfer and additional weight savings because no additional elements need to be installed. Furthermore, the thermal transfer between the heating device and, for example, the inner hose may be optimized because the heating device is integrated in the conduit segments.

BRIEF DESCRIPTION OF THE DRAWINGS

The present invention will hereinafter be described in conjunction with the following drawing figures, which are diagrammatic and not to scale, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
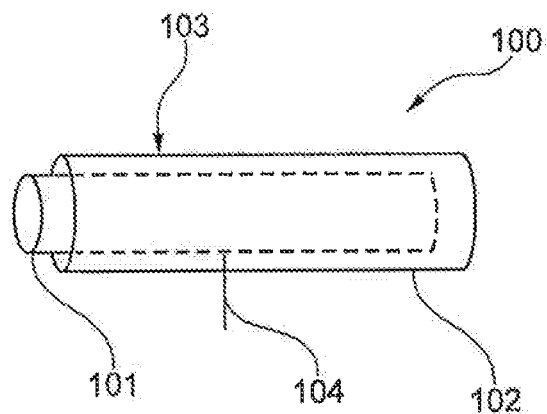
FIG. 1 shows a self-heating fluid conduit segment according to a first embodiment with a folded fabric.
Figure 2:
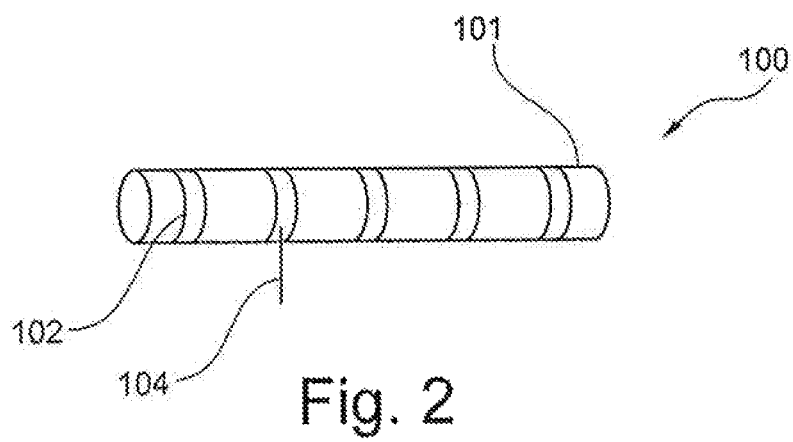
FIG. 2 shows a self-heating fluid conduit segment according to a second embodiment with a wound fabric.
Figure 3:
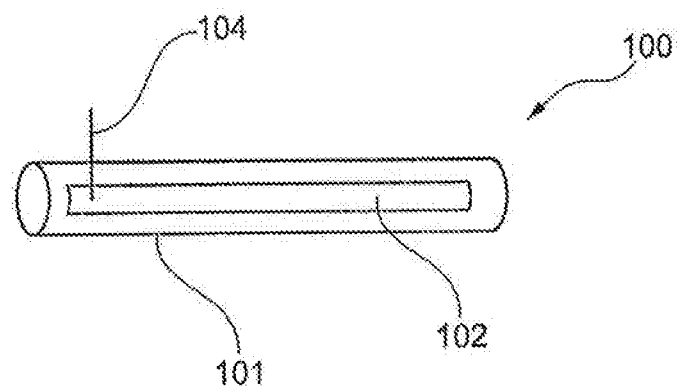
FIG. 3 shows a self-heating fluid conduit segment according to a third embodiment with the fabric aligned in longitudinal direction.

FIG. 1 to FIG. 3 show self-heating fluid conduit segments 100 according to exemplary embodiments. The fluid conduit segments 100 in each case comprise an inner hose 101 and a heating device with a PTC-fabric heating element 102. Furthermore, electrical connections 104 are provided that connect the PTC-fabric heating element 102 at the beginning/end or in the middle to the power supply. The power supply, if applicable with control electronics, the connections 104 and the PTC-fabric heating element 102 are hereinafter referred to as the "heating device" 103.

In the exemplary embodiment of FIG. 1 the fabric shape of the PTC-fabric heating element 102 matches the external diameter of the hose 101. The corresponding ends of the fabric heating element 102 abut. As an alternative, the fabric heating element 102 can also be designed as a sleeve. The sleeve is manufactured so that it precisely fits the outer diameter of the component to be heated and is pulled over the aforesaid with the use of a lubricant and sealant, e.g., silicon. The beginning of the hose and the end of the hose correspond to the length of the fabric heating device, see also FIG. 4. In the exemplary embodiment of FIG. 2 the PTC-fabric heating element 102 is helically wound onto the inner hose 101 and is bonded to the latter. The spaces between the individual windings are, for example, approximately 30 millimeters. In the exemplary embodiment of FIG. 3 the PTC-fabric heating element 102 is bonded so as to be parallel to the inner hose, i.e., is designed so as to be strip-shaped.

The electrical connections 104 of the fabric heating element are resistant to a salt water negative-pressure test. The salt water/negative-pressure test essentially comprises the test specimen, except for the connector part of the electrical interface connection, being completely immersed in a vessel comprising salt water made from approximately 90% distilled water. The test is deemed to have been passed if the specimen is exposed for approximately 30 days in an environmental chamber where at prescribed intervals it is subjected to alternating pressure ranging between approximately 1013.25 hPa and approximately 100 hPa, and if the prescribed insulation resistance and dielectric resistance test was passed. These stringent requirements must be met, for example for applications in passenger aircraft. For example, the PTC-fabric heating element is still adequately insulated towards the outside or the Cres braid, the corrosion-resistant braid or copper/nickel braid or fitting housing of the fluid conduit segment even after a test duration of approximately 30 days in which the pressure is cyclically altered between approximately 1013 millibars and approximately 100 millibars. In this case the resistance is greater than approximately 3000 mega ohms.

The fabric heating element makes it possible to use heated hoses in aircraft because it is relatively light in weight. The weight savings with one meter of hose length and a hose thickness of approximately half an inch (corresponding to a surface of approximately 398 square centimeters) is approximately 12 grams per meter, which corresponds to an areal density of approximately 0.03 grams per square centimeter for the fabric heating element. A corresponding strip heater comprises a weight of approximately 110 grams per meter.

Furthermore, the use of a fabric heating device can lead to cost savings, not least as a result of the reduced weight. Further advantages include the homogeneous temperature distribution, the over temperature limitation as a result of self-limitation, the lack of a need for bimetal switches, the reduction in electrical power (kilowatts), the automatic matching of the heat output over the hose length depending on the different ranges of ambient temperatures, the high flexibility when compared to VA-pipes (made from stainless steel) with strip heaters, the vibration resistance, the changeability of direction and length of the fluid conduit segment, the output tolerance of only plus/minus approximately 5% of the end value, compared to an output of plus approximately 6.5 watts per meter and minus approximately 1.5 watts per meter for a strip heater. Thus, optimal current monitoring may be possible. The power density of the fabric is, for example, approximately 0.5 watt per square centimeter. In the case of doubly-laid fabric it is approximately 1 watt per square centimeter.

The hoses (fluid conduit segments) can be heated in the temperature range from approximately minus 63 degrees Celsius to approximately plus 85 degrees Celsius without this requiring complicated control electronics as would be the case with NTC-heat fabric. The temperature dependence of the PTC-fabric heating element is in this temperature range, for example, linear. The increase in the output in the negative temperature range is progressive, while the output in the positive temperature range is reduced. The coated PTC-heating fabric (e.g., glass filament, polymers, or polyimide) is embedded in the hose in a silicon Nomex compound. The heating fabric is covered by a shielding braid comprising steel or copper/nickel, and the hose is then mechanically protected by means of a Nomex sheath fabric. The materials used conform to FAR or RTCA DO 160. The electrical power outlet is designed so as to be water proof, the conduits are color-coded and are designed with neutral conduit recognition as well as comprising individual colored bayonet connectors or circular connectors that require no tools for separation.

For improved thermal conduction in the connection region between the individual fluid conduit segments (i.e., fitting plug-in region) instead of VA-fittings (i.e., non-corroding fittings) it is possible to press brass fittings to a VA-cylinder in order to obtain good thermal conduction. Apart from straight, angular screw, weld, roll and compression flanges, instead of a snap lock a quick-disconnect can be provided for the hose interface so that simple detachment and closing and weight optimization of the hoses is made possible. The fittings can be screw, crimp, roll, weld, or bond connection types to VA conduits or conduits comprising titanium, aluminum, plastic, or metal.

The fittings can be easily connected and disconnected (so-called quick-disconnect fittings). Examples of female connection pieces between adjacent fluid conduit segments are shown in FIG. 12. The parts 1201 can be inserted into corresponding male components (similar to garden hose fittings).

The PTC heating characteristics are achieved by the incorporation of corresponding soot particles. As an alternative to polymer threads (e.g., PTFE/PFA threads) it is also possible to use cotton threads that have been impregnated with soot.

Figure 4:
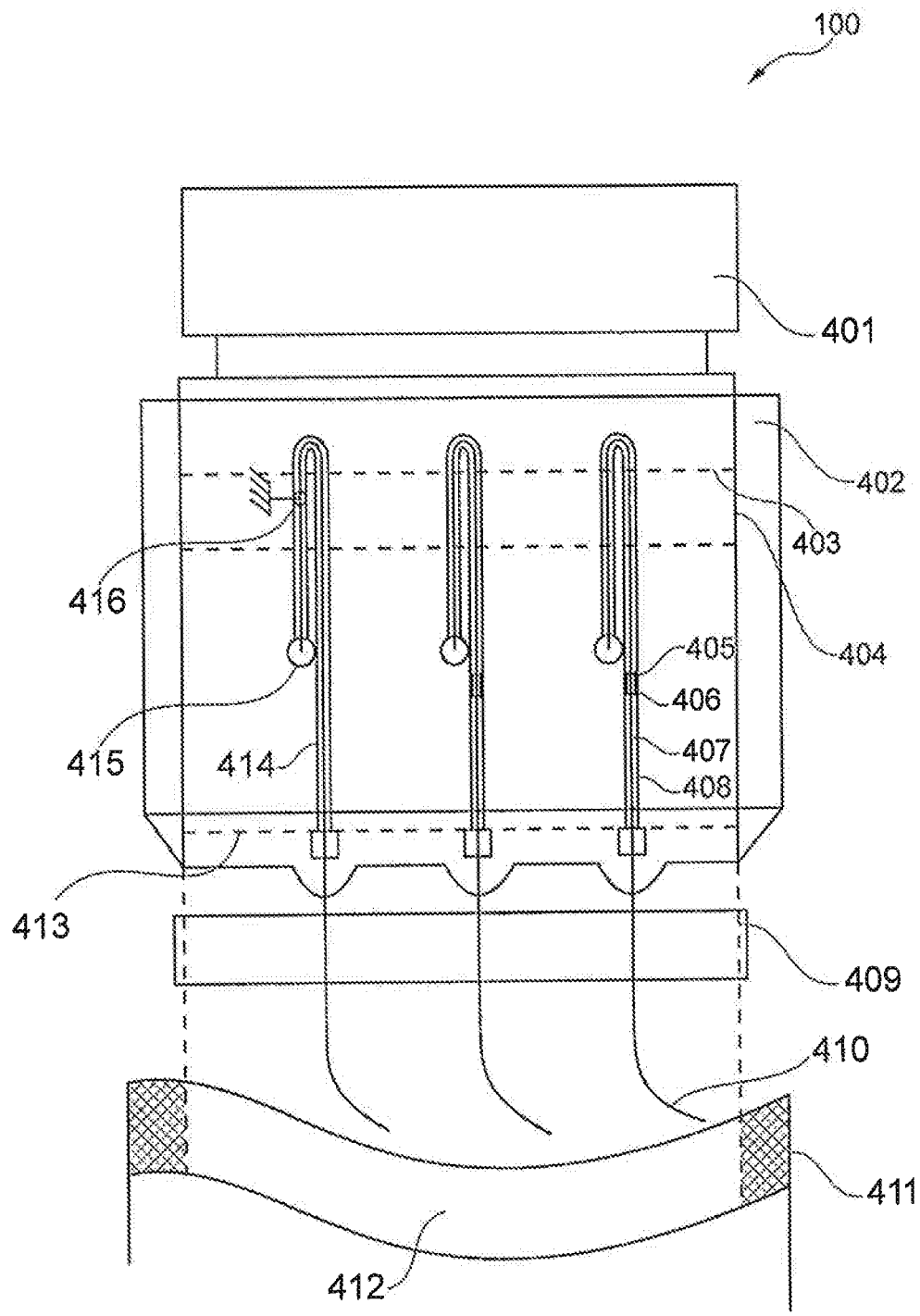
FIG. 4 shows an end of a self-heating fluid conduit segment according to an exemplary embodiment.

FIG. 4 shows a hose end with a corresponding fitting 401 into which a corresponding counter fitting of a fluid conduit segment to be connected can be inserted. The hose fitting 401 is, for example, designed in the form of VA/chrome-plated brass. The multicolored (e.g., red, blue and white) connecting wires 410 comprise, for example, a conduit cross section of approximately 1 mm$^2$. The hose fitting material 401 comprises stainless steel (VA) or chrome-plated brass with a VA compression bush. The diagram shows the female plug-in bush component.

The outer silicon encapsulation 402 (e.g., RT 607 or equivalent), encloses the aramid outer sheath, Nomex outer sheath or Kevlar outer sheath of the hose. The braid ends underneath the compression bush. The end 403 of the heating fabric in the silicon compound is above the FEP-, PFA-inner hose and underneath the silicon/Nomex and Cres or corrosion-resistant copper/nickel shielding braid. In the end region, depending on requirements, a higher power density, maximum of approximately 0.5 W/cm2, is to be provided. Furthermore, a stainless steel bush 404 is provided which presses the hose construction with the outer sheath onto the grooved outer diameter of the VA fitting or brass fitting in order to in this way achieve tightness and tensile strength of the hose.

The connection 405 of the two heating-fabric silver-wire strands to the nickel-plated copper cores of the 1 mm$^2$ connecting conductors is soldered, welded or compressed by means of a core end cap. At its connection to the silver wire the 1 mm$^2$ connecting line 406 is sealed by means of Loctite against the ingress of moisture as a result of capillary action.

In each case a shrinkable silicon sleeve (e.g., SFR-2.9/1.7.8 RYCHEM), is pushed over each of the three conduit connections 407 (i.e., from the outlet of the heating-device fabric to the outlet of the three connecting conductors). At the outlet of the heating-device fabric, in each case a short shrinkable sleeve (approximately 5 mm) has first been shrunk on in order to seal the gel against leakage onto the silver wire conduit.

Subsequently, the first SFR shrinkable silicon sleeve is at first shrunk onto the short shrinkable sleeve only at the end.

By means of the gel 408 (e.g., polyurethane or ISO-PUR A776), the silicon hose over the conduits is filled in a bubble-free manner and is carefully shrunk up to the outlet of the connection conduit. At the end the shrinkable sleeve is squeezed in its deformable state so that the gel can dwell in the shrinkable sleeve. In this way a moisture barrier to the exit of the PTC-hose fabric conduit is created. At the same time each conduit is installed in a bifilar manner in the connection region so that as a result of the longer path an impeccable moisture barrier is achieved. An additionally bonded-on shrinkable sleeve 409 above the three connecting conductors, for example on the Nomex fabric, is used as a strain relief device. The connecting conductors exit from the silicon encapsulation at a particular spacing parallel to the hose. For improved guidance and for an improved seal, the silicon encapsulation extends at the conduit outlet as a "finger". For improved identification the three connecting conductors 410 are provided in the colors:

Red=e.g., 115V AC

Blue=AC GND

White=housing mass (e.g., fitting, shielding).

The cross section of the conduits approved for aviation is approximately 1 mm$^2$.

Optionally, approximately 10 mm insulation foam 411 can be installed on the fabric heating-device hose in order to save electrical power. As a protective mechanical braid and in order to provide rigidity, for example a Nomex, Kevlar or aramide sheath 412 can be used. Above the three connecting conductors in the overall silicon encapsulation, likewise, a shrinkable sleeve 413 is arranged in order to affix the conduits and as a strain relief device.

The insulation sheath 414 of the three connecting conductors is to be etched in the case of an outer FEP (e.g., tetra etch) in order to establish better adhesion to the silicon. The silver-wire conduits exit in a decoupled manner, for example from the Nomex braid and the shielding braid, behind the VA compression bush from the silicon compound, e.g., at location 415. The bonding connection (e.g., housing mass) 416 of the, for example, corrosion-resistant shielding braid and of the fitting is implemented on the VA compression bush by welding.

Figure 5:
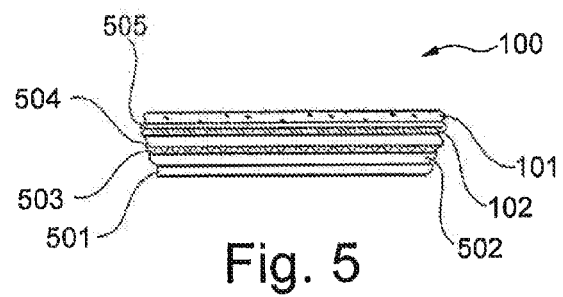
FIG. 5 shows the layer design of a fluid conduit segment according to an exemplary embodiment.

FIG. 5 shows a cross section of part of a fluid conduit segment 100. In the interior region of the segment the inner hose 101 is provided, which comprises, for example, PFA, FEP and/or PTFE and can comprise a wall thickness of approximately 0.1 millimeters. This is followed by a silicon layer 505, in turn followed by the heating fabric 102 (e.g., glass filament/polymers/soot/polyimide, with a thickness of, for example, approximately 0.3 millimeters)).

Between the heat fabric 102 and a shielding braid 503 comprising copper/nickel and/or CRES 504 there is a Nomex layer 504. This is followed by a silicon layer 502, in turn followed by a Nomex braid or Kevlar 501 that forms the outer layer of the fluid conduit segment. The overall thickness of the hose wall is approximately 2.6 millimeters.

Figure 6:
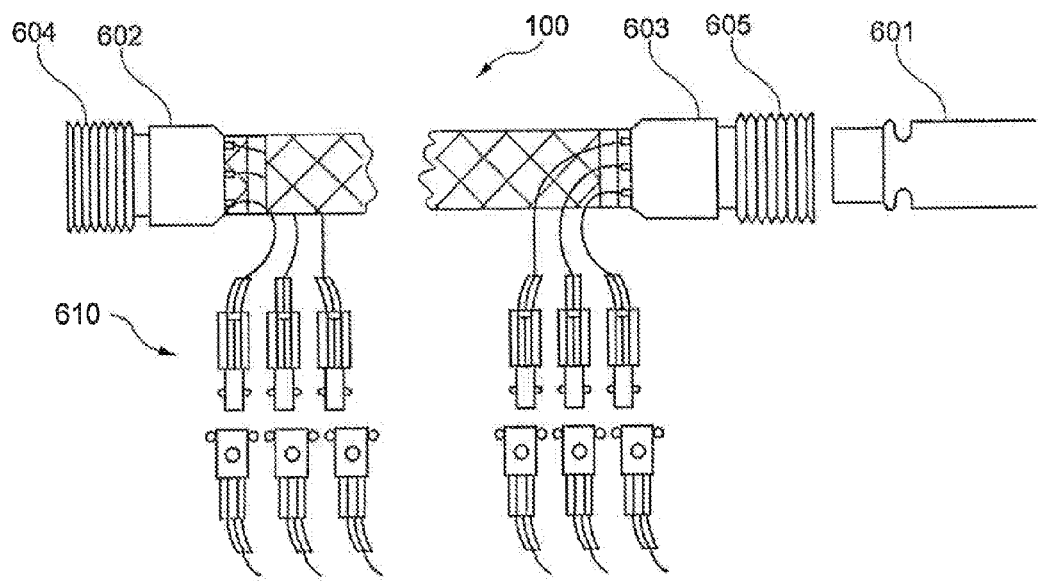
FIG. 6 shows a self-heating fluid conduit segment in the form of a through heater with quick-action fasteners and individual disconnect able electrical plug-in connections according to an exemplary embodiment.

FIG. 6 shows a fluid conduit segment in the form of a through heater. Both segment ends 602, 603 comprise the connections shown in FIG. 4 and can be connected, by way of a corresponding fitting 604 or 605, to a continuing fluid conduit segment 601 or a connecting piece, e.g. in a manner similar to that of Gardena hose systems. The conduit exits 610 with the male connectors are color-coded, for example, red, blue and white, and/or comprise a shrinkable sleeve with corresponding markings, e.g., A1, A2 or A3. The connecting conductors 611 with the corresponding female connectors are marked correspondingly.

Figure 7:
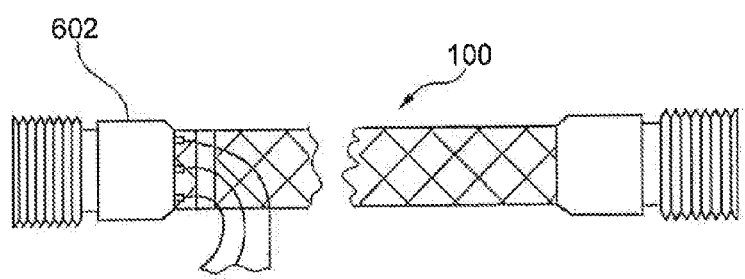
FIG. 7 shows a self-heating fluid conduit segment in the form of an end heater with quick-action fasteners according to an exemplary embodiment.

FIG. 7 shows an end heater in which the fluid conduit segment 100 only comprises one electrical connection 602 on one of the two ends.

Figure 8:
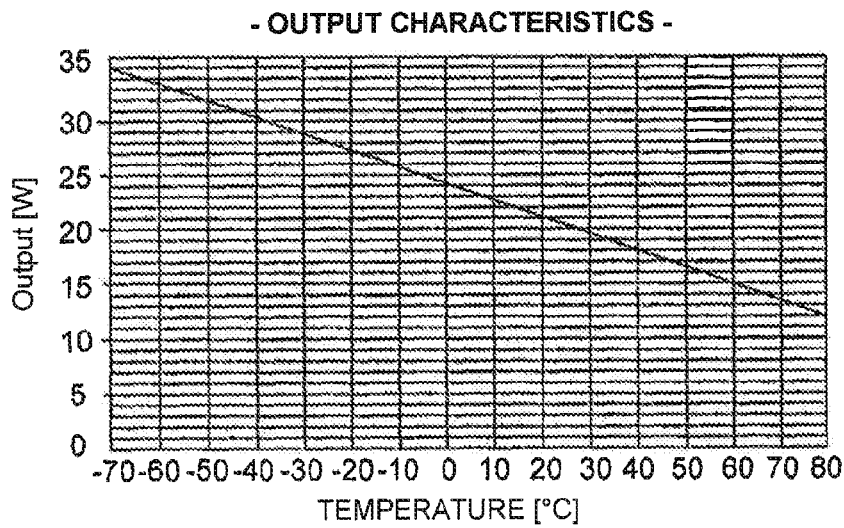
FIG. 8 shows the dependence of the output on the temperature of the heating device according to an exemplary embodiment.

FIG. 8 shows a temperature output curve relating to the PTC-fabric heating element. The curve has a linearly decreasing course in the temperature range from approximately minus 70 degrees Celsius to approximately plus 80 degrees Celsius. At approximately minus 70 degrees Celsius the output is, for example, approximately 34 watts while at approximately plus 80 degrees Celsius the output is approximately 12 watts. The maximum power density is approximately 0.5 watt per square centimeter, or when used doubled-up, in other words with two fabric heating layers, approximately 1 watt per square centimeter.

The fluid conduit segments are used in aircraft in which hoses among other things for the fresh water system (e.g., tanks, service panels, valve connections, toilets and galleys in the flexible region), drainage system, fuel system, hydraulic system, air conditioning system and humidifiers need to be heated to prevent them from freezing.

The flexible fabric heating devices of the fluid conduit segments feature a small bending radius (for example in the magnitude of a single diameter), homogeneous power distribution, homogeneous temperature distribution, insensitivity to bending, light weight and a thin wall thickness. Furthermore, no additional electronics are required, because temperature control does not have to be inverted. The fluid conduit segments can, among other things, be used for wastewater conduits, urinals, drainage, conduits carrying human waste, air conduits, fresh water conduits, hydraulic conduits, fuel lines, tanks, service panels, valves, toilets, galleys in the flexible region and humidifier connections. The flexibility of the fluid conduit segments is, in particular, advantageous when strong vibrations and aircraft cell movement are experienced, during tolerance-free installation, as well as in difficult installation conditions and during maintenance work. There is no need to provide rigid VA pipes in the interface to the galleys and toilets, because they are replaced by the heated fluid conduit segments with quick-action fasteners, preferably comprising chrome-plated brass, or brass fittings with VA compression bushings.

The quick-action fastener comprises, for example, three parts: a fitting (VA) for the incoming pipe (rolled) ("male") plus an O-ring, a fitting on the next fluid conduit segment, also VA, rolled ("female"), a clamp with metal springs. Furthermore, the quick-action fastener can be designed according to the garden hose principle: a brass fitting with sliding cylinder ("female") and a brass fitting ("male") plus an O-ring.

In the fitting region it is possible to use brass material because of its relatively good thermal conduction. The short pipe sections at the service panel can be replaced by heated fluid conduit segments. This makes it possible to variably install valves, nipples etc.

Due to their relatively rigid terminals, strip heaters may be difficult to install in the case of short pipes. Furthermore, there is no need to provide attachment material for the strip heater, i.e., a glass filament tape with an adhesive film. By means of quick-disconnect connectors 610 the PTC-fabric heating element can be connected directly to an existing strip heater circuit. This results in cost savings in relation to the control circuits (conduits, electronics, sensor clips), in weight savings and in savings relating to installation expenditure. Furthermore, it may not be necessary to install over temperature switches or temperature fuses, because the heat output is limited by the PTC-behavior. Furthermore, an over temperature switch can be installed on the brass fitting.

The PTC-sensor (e.g., TP5A made by Honeywell) for regulation by way of the control unit electronics (including monitoring of the heater circuit) can in any case be affixed to the brass fitting, in other words to the connecting element. The brass material is, for example, approximately 00-P-626 composite 360½ hard CUZN40A12 or ASTM B16/B16M ½ hard with a chrome coating approximately 70 micrometers in thickness.

The high flexibility of the fabric heating element results, for example, from the thread thickness and the type of braid. Because of its low bending radius the fabric heating element is, in particular, suitable for hose applications. The following threads can, for example, be used: cellulose/soot particle thread of a diameter of approximately 0.15 mm, glass filament thread of a diameter of approximately 0.05 mm on both sides, overall thickness of the fabric approximately 0.25-0.28 mm. A Kapton foil heater with polyimide coating comprises, for example, an overall thickness of approximately 0.25 mm.

The weight of the fabric heating element is approximately 36 grams per meter in the case of a pipe with a diameter of half an inch, in this case strip heating elements comprise a weight of 110 grams per meter. The larger heated surface results in a relatively lower surface temperature of the fabric. In relation to the heated item (medium, e.g. water) the fabric heating element heats the entire area. It is advantageous if the inrush current of the fabric heating device does not exceed the range of the nominal current.

The supply voltages can be 115 volts, 320 to 800 hertz. Moreover, for special applications low voltages of, for example, 28 volts DC may be possible.

The bending radius of the fabric heating element can be approximately 1.8 millimeter. Due to the fabric heating element being embedded in the fluid conduit element, faster temperature input in the medium is possible. The maximum temperature with continuous operation of the fabric heating element, for example at an ambient temperature of approximately plus 10 degrees Celsius and a pipe diameter of approximately one inch, is 75 degrees Celsius at 18 watts per meter. This reduces the risk of the 10 millimeter thick insulating foam shrinking or the hose composite materials being overloaded in a temperature sense.

Figure 9:
FIG. 9 shows a diagrammatic view of an end heater and of a through heater according to an exemplary embodiment.
Figures 10A, 10B, 10C:
FIGS. 10A, 10B and 10C show three different mechanical connections for a fluid conduit segment according to an exemplary embodiment.

FIG. 9 shows a fluid conduit segment as an end heater (left-hand side) and a fluid conduit segment as a through heater (right-hand side). The end heater comprises an electrical connection only at one end, while the through heater comprises an electrical connection at each end. The interface of the connection electrics can comprise six individual quick disconnects (red, blue, white), three individual jiffy junctions (silicon sheath, base color red) or a circular connector (e.g. six terminals) and corresponding ongoing leads. The mechanical connection between the individual fluid conduit segments can comprise titanium, VA or chrome-plated brass. FIG. 10A, FIG. 10B and FIG. 10C show three possible mechanical connection types. FIG. 10A shows a screw connection, FIG. 10B shows a clamp-spring connection, and FIG. 10C shows a quick-action fastener according to the garden hose principle with a slide lock. Apart from providing straight hose connections, angular connections can also be provided.

Figure 11:
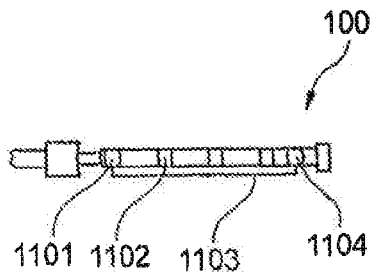
FIG. 11 shows a hose suspension device according to an embodiment.

FIG. 11 shows a special device for horizontal hose installation to prevent the hose from sagging. The hose ends comprise clamp-like plastic molded parts 1101, 1104 to which a deformable aluminum bar or plastic bar 1103 has been affixed that can be deformed according to the hose bending in the installation. In several locations the hose is attached to the aluminum bar by means of self-welding tape 1102 so that said hose is secured against sagging. The fluid conduit segment can be embedded in insulating foam (e.g., approximately 10 mm in thickness).

The heat output density can be set by a suitable selection of the heating thread thickness, fabric density and soot particle density. As a result of the fabric-like structure of the heating element, due to the parallel arrangement of the threads it is possible to continue heating if individual heating threads fail.

The bending radius of the fluid conduit segment equates to less than three times the hose diameter. It is also possible to use aramid as an outer sheath of the fluid conduit segment. The pressure resistance of the fabric is approximately 250 newtons per square centimeter. The carbon threads of the heat fabric are connected to silver wires or to a coated conductor path as a connection of the parallel carbon threads.

Figure 12A:
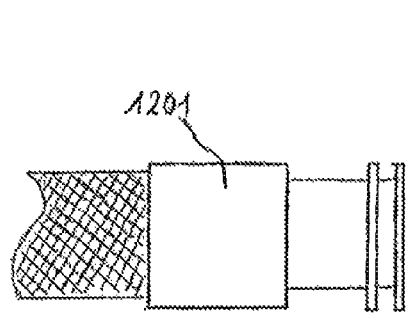
FIGS. 12A, 12B show a VA-fitting for connecting the fluid conduit segments according to an embodiment.
Figure 12B:
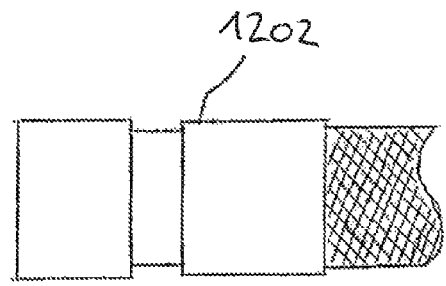
Figure 12D:
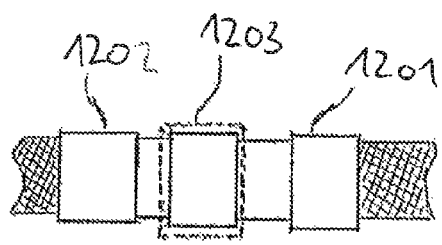
FIG. 12D shows the fittings of FIGS. 12A and 12B in their plugged-together state.
Figure 12E:
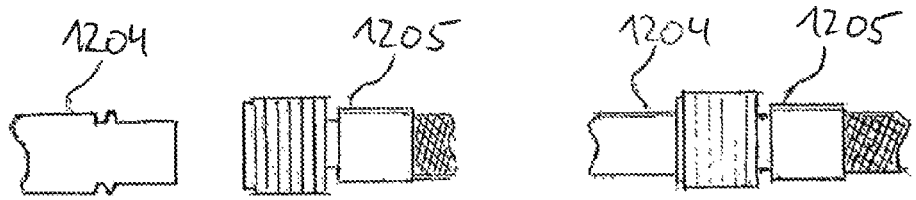
FIG. 12E shows alternative quick-action connectors.
Figure 12C:
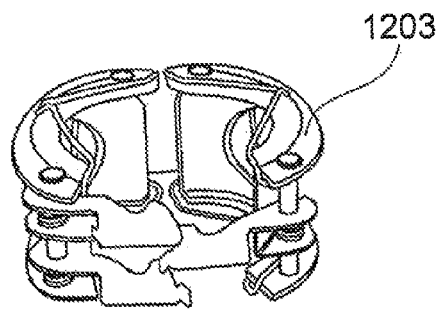
FIG. 12C shows a quick-action clamp according to an embodiment.

FIG. 12A and FIG. 12B show fittings 1201, 1202 according to an exemplary embodiment, which fittings can be pushed together in the manner of quick-action connectors in order to interconnect two conduit segments. FIG. 12D shows the fittings of FIG. 12A and FIG. 12B in their plugged-together state. FIG. 12C shows a quick-action clamp 1203 that affixes the two fittings 1201, 1202 to each other. FIG. 12E shows alternative quick-action connectors 1204, 1205 in their separated state (left-hand side) and in their plugged-together state (right-hand side), which connectors are designed in a manner similar to that of a garden hose (Gardena principle).

Figure 13:
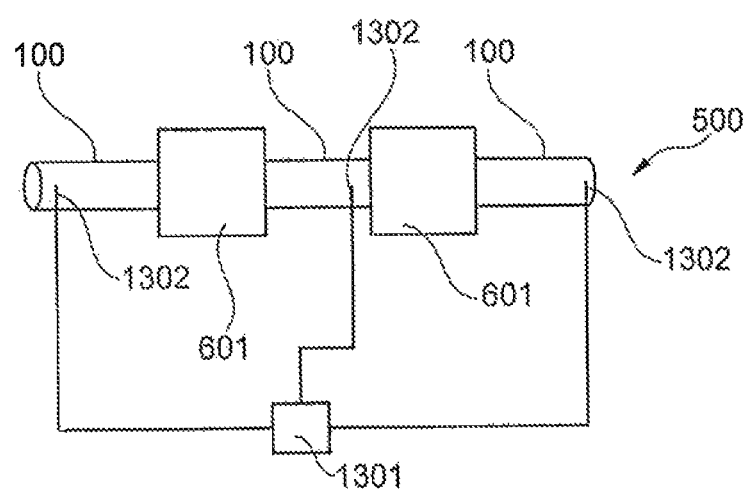
FIG. 13 shows a self-heating fluid conduit system for an aircraft according to an embodiment.

FIG. 13 shows a self-heating fluid conduit system 500 comprising several self-heating fluid conduit segments 100 that are interconnected by way of corresponding connecting elements 601. Each of the fluid conduit segments is connected to a current supply 1301 (energy supply) by way of at least one connection 1302. This energy supply can also comprise electronics for controlling the heating system.

Figure 14:
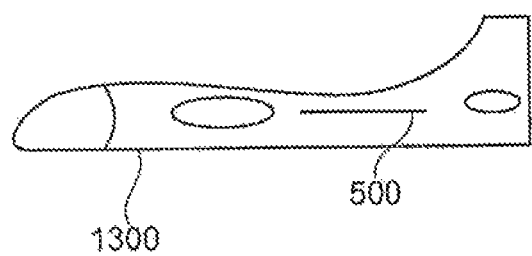
FIG. 14 shows an aircraft according to an embodiment.

FIG. 14 shows an aircraft 1300 comprising a fluid conduit system 500 according to an exemplary embodiment of the invention.

It should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A self-regulating fluid conduit system for an aircraft configured to protect against icing, the self-regulating fluid conduit system comprising:
   an elongated first self-regulating fluid conduit segment having a first segment end and a second segment end, the first self-regulating fluid conduit segment comprising:
   a first inner hose configured to conduct a fluid; and a first heating device comprising a first PTC-fabric heating element that is integrated in the first self-regulating fluid conduit segment and includes a first resistance that changes substantially linearly in a temperature range between negative 63° Celsius and positive 80° Celsius;

wherein each one of the first segment end and the second segment end has a connection of the same type; and an elongated second self-regulating fluid conduit segment having a third segment end and a fourth segment end, the second self-regulating fluid conduit segment comprising:

a second inner hose configured to conduct a fluid; and a second heating device comprising a second PTC-fabric heating element that is integrated in the second self-regulating fluid conduit segment and includes a second resistance that changes substantially linearly in the temperature range between negative 63° Celsius and positive 80° Celsius;

wherein each one of the third segment end and the fourth segment end has a connection of the same type as the first segment end and the second segment end of the first self-regulating fluid conduit segment; and a connecting element configured to mechanically and electrically connect any one of the first segment end and the second segment end of the first self-regulating fluid conduit segment to any one of the third segment end and the fourth segment end of the second self-regulating fluid conduit segment.

2. The self-regulating fluid conduit system of claim 1, wherein the first PTC-fabric heating element comprises glass filament.

3. The self-regulating fluid conduit system of claim 1, wherein the first PTC-fabric heating element comprises a polymer.

4. The self-regulating fluid conduit system of claim 1, wherein the first PTC-fabric heating element comprises a polyimide.

5. The self-regulating fluid conduit system of claim 1, wherein the first PTC-fabric heating element comprises a thread.

6. The self-regulating fluid conduit system of claim 1, wherein the first PTC-fabric heating element comprises soot particles.

7. The self-regulating fluid conduit system of claim 1, wherein the first PTC-fabric heating element comprises a polyimide coating.

8. The self-regulating fluid conduit system of claim 1, wherein the first PTC-fabric heating element comprises a first cellulose thread that is impregnated against flammability and humidity.

9. The self-regulating fluid conduit system of claim 1, wherein the first self-regulating fluid conduit segment is flexible.

10. The self-regulating fluid conduit system of claim 1, the first self-regulating fluid conduit segment further comprising a first outer insulation sheath comprising plastic that is applied after installation of the first self-regulating fluid conduit segment.

11. The self-regulating fluid conduit system of claim 1,
wherein the first self-regulating fluid conduit segment comprises a plurality of layers; and
wherein the first PTC-fabric heating element is embedded in a silicon-aramid compound.

12. The self-regulating fluid conduit segment of claim 1, the first self-regulating fluid conduit segment further comprising a first metallic shield braid covering the first PTC-fabric heating element.

13. The self-regulating fluid conduit system of claim 1, the first self-regulating fluid conduit segment further comprising a first sheath layer configured to mechanically protect the first PTC-fabric heating element.

14. The self-regulating fluid conduit system of claim 13, wherein the first sheath layer is an aramid-sheath fabric layer.

15. The self-regulating fluid conduit system of claim 1, wherein the first PTC-fabric heating element is configured in a hose-like manner.

16. The self-regulating fluid conduit system of claim 1, the first self-regulating fluid conduit segment further comprising a first electrical connection that is substantially waterproof and configured to connect the first PTC-fabric heating element to an external energy supply.

17. The self-regulating fluid conduit system of claim 1, wherein the fluid is a fuel for an engine of an aircraft.

\* \* \* \* \*